(12) United States Patent
Tunnecliff

(10) Patent No.: US 6,474,427 B1
(45) Date of Patent: Nov. 5, 2002

(54) WHEELED DEVICE WITH DIFFERENT OPERATIONAL MODES

(76) Inventor: James William Tunnecliff, Fairview Views Motor Inn Barooga Road, Tocumwal NSW 2714 (AU)

( * ) Notice: Subject to any disclaimer, the term of this patent is extended or adjusted under 35 U.S.C. 154(b) by 0 days.

(21) Appl. No.: 09/549,657

(22) Filed: Apr. 14, 2000

(51) Int. Cl.⁷ .............................. B62D 51/04; B60K 1/00
(52) U.S. Cl. ................. 180/19.1; 180/19.2; 280/DIG. 5
(58) Field of Search ............................... 180/19.1, 19.2, 180/65.1, 65.2; 280/DIG. 5, DIG. 6, 776, 89

(56) References Cited

U.S. PATENT DOCUMENTS

| | | | | | |
|---|---|---|---|---|---|
| 2,182,596 | A | * | 12/1939 | Olsen | 74/495 |
| 3,043,389 | A | * | 7/1962 | Steinberg | 180/27 |
| 3,087,562 | A | * | 4/1963 | Harks | 180/11 |
| 3,247,923 | A | * | 4/1966 | Cornell | 180/19 |
| 3,434,558 | A | * | 3/1969 | Allen | 180/26 |
| 3,513,924 | A | * | 5/1970 | Jackson | 180/11 |
| 4,063,612 | A | * | 12/1977 | Weiss | 180/195 |
| 4,538,695 | A | * | 9/1985 | Bradt | 180/19.2 |
| 4,848,504 | A | * | 7/1989 | Olson | 180/191 |
| 6,082,754 | A | * | 7/2000 | Jeunet et al. | 280/272 |
| 6,139,032 | A | * | 10/2000 | Hartman | 280/32.7 |

* cited by examiner

Primary Examiner—Daniel G. DePumpo
Assistant Examiner—Tony Winner
(74) Attorney, Agent, or Firm—Killworth, Gottman, Hagan & Schaeff, L.L.P.

(57) ABSTRACT

A motorized golf buggy or cart that is readily convertible between a "ride on" condition in which the golfer sits on the buggy and a "walk" condition in which the golfer walks behind the buggy or cart in a forward direction is described. The buggy or cart can be readily converted between the two different positions as desired by the golfer during the round of golf. The golf buggy or cart has a steering member pivotally connected to a wheel assembly such that movement of the steering member causes the golf buggy or cart to turn. The steering member can adapt to at least two different positions in which one of the positions corresponds to the "ride-on" position and another position corresponds to the "walk" position by movement in a substantially vertical plane containing the steering member. The steering member is also provided with at lease two steering elements so that the buggy can be steered by the golfer in either mode. One form of the buggy has an extendible wheel base in which the front wheel assembly having the steering member is moved forward from the rear wheel assembly to extend the wheel base of the buggy.

25 Claims, 11 Drawing Sheets

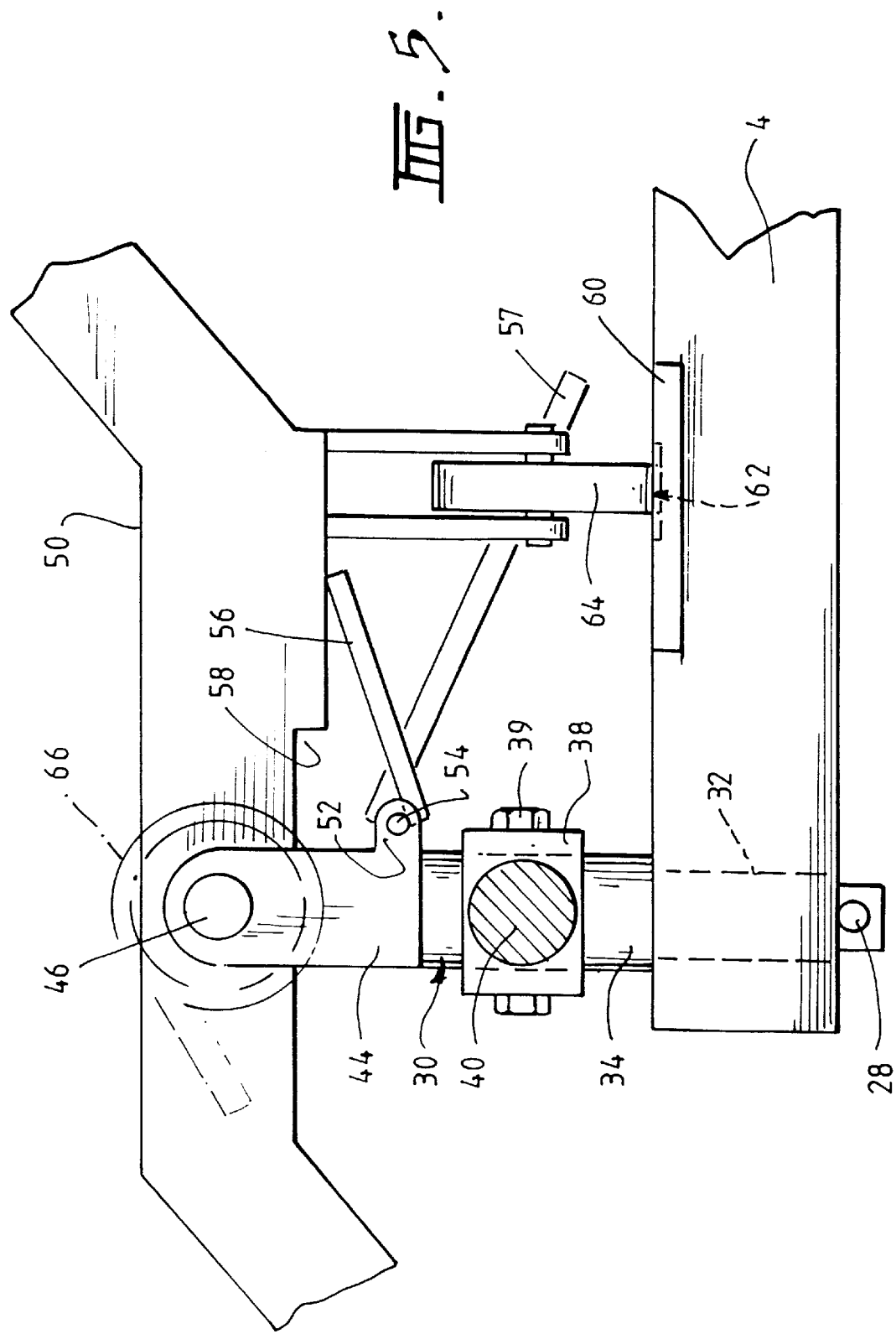

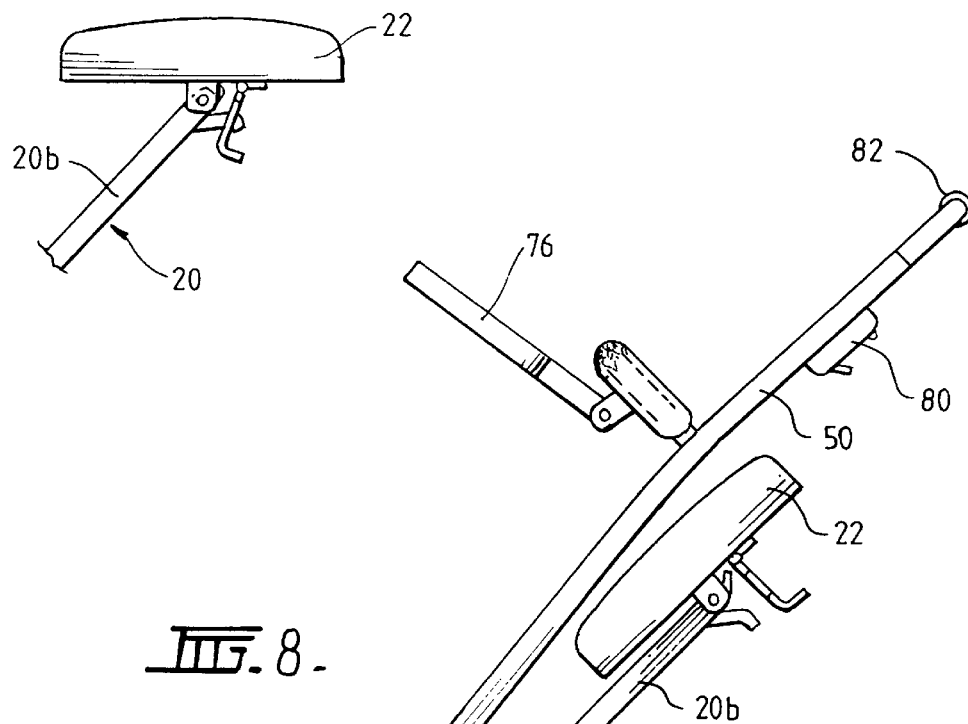
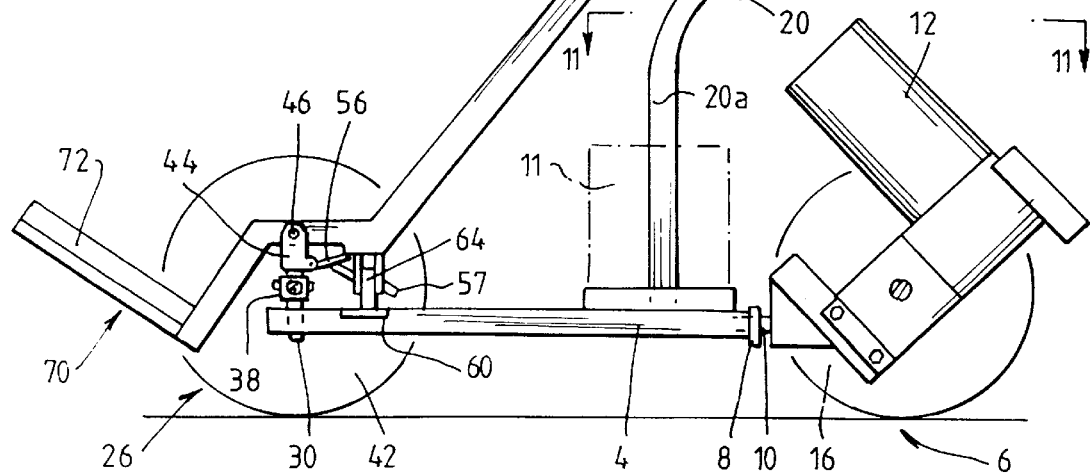

WHEELED DEVICE WITH DIFFERENT OPERATIONAL MODES

The present invention relates to wheeled devices, in general and to devices for transporting equipment and goods in particular. More particularly, the present invention relates to wheeled devices for use in carrying a load, particularly in sporting and recreational pursuits, as well as for use in transporting equipment and people. Even more particularly, the present invention relates to a golf buggy or cart for use in carrying, particularly on the steering member of the buggy or cart, a set of golf clubs in a golf bag during a round of golf. The present invention relates to a golf buggy or cart having at least one or more, preferably two, different operational modes being a "ride" or "ride-on" mode in which the golfer sits on the buggy or cart whilst travelling around the golf course and a "walk" or "walking" mode in which the golfer walks behind, or beside, the buggy whilst the buggy is in use wherein the golf bag containing the golf club set is supported on suitable supports provided on or attached to the steering member used to steer the buggy.

Although the present invention will be described with particular reference to various forms of the golf buggy it is to be noted that the scope of the present invention is not restricted to the described embodiments, but rather the scope of the present invention is broader by encompassing other arrangements and forms of the wheeled device and their use in other applications then specifically described.

It is to be noted the word "buggy" used in the present invention includes devices variously known as golf buggies, golf carts, golf bags with wheels, and the like including motorised vehicles. The word buggy will be used for ease of description to refer to these devices and is not meant to be limiting in any way. Accordingly, any wheeled device for carrying a golf bag is included within the scope of the term "buggy". Furthermore, the buggy is described with reference to its in use orientation so that words such as forward, up and the like refer to its ordinary use orientation.

When playing a round a golf it is usual for the player to have a buggy or cart to carry and transport the players golf bag and clubs from hole to hole during the round. Existing buggies can range from a simple two wheeled frame having a single support for retaining the bag on the buggy and a handle for pulling or pushing the buggy all the way up to large motorised vehicles referred to as carts, capable of transporting two or more people together with all of their golfing needs as well as other needs such as food and drink or even other equipment for the maintenance of the golf course.

For elderly golfers or when difficult terrain is encountered, manually pushing or pulling the golf buggy for 18 holes becomes extremely tiring, due in part to the effort required to manocuvre the buggy around corners and to traverse rough terrain. Attempts have been made to reduce the effort required by providing a motorised buggy. Whilst the inclusion of a motor reduces the effort of pushing or pulling the buggy around the golf course, such motorised buggies can not be used as ride on buggies for a variety of reasons. Further, such buggies are not so versatile to allow golfers to walk behind the buggy for the first part of the round, optionally using the motor, and then ride on the buggy for the last few holes of the round when they become tired. Whilst most golfers are fit and active enough to complete the first 9 holes of a golf round, many players including young and fit players have difficulty in completing the last 4 or 5 holes of a round of golf. Therefore, there is the need for a simple, compact and inexpensive golf buggy which can be used in a walk mode for the first 10 to 14 holes or so and then be used as a ride-on buggy for the remaining 4 to 8 holes or can be used in situations where the golfer wishes to ride on the buggy. Such a buggy, if it were provided would enable many more golfers, particularly elderly golfers and less fit golfers to play 18 holes for as soon as they became tired they could adapt the buggy into the "ride-on" mode to complete the round. Of necessity, the combined walking buggy and ride on buggy needs to be compact and of light weight to permit handling and dismantling yet strong and sturdy enough for it to be a ride-on buggy and have a sufficiently powerful motor to transport the player and his golf bag and golf clubs from hole to hole even over hilly terrain or similar.

Therefore, there is a need for a golf buggy convertible between a walking mode and a ride on mode which will allow a golfer to use the buggy as a walking buggy for some holes and a ride-on buggy for the remaining holes.

Accordingly, it is an aim of the present invention to provide a golf buggy which is adaptable for use as a ride on buggy or a walking buggy by being convertible between the two different modes.

Another aim of the present invention is to provide a motorised buggy convertible between a walking buggy and a ride-on buggy that can be quickly and easily disassembled for transport in the boot or trunk of a motor vehicle or automobile.

A still further aim is to provide a variety of convertible buggies with different features and different motor arrangements that can be used in differing conditions.

According to one aspect of the present invention there is provided a wheeled device adapted for carrying or transporting a load, particularly a golf buggy or cart for carrying a golf club containing a set of golf clubs, said device including:
- a wheel assembly having at least a pair of ground contacting wheels capable of pivotal movement to alter the direction of travel of the wheeled device;
- a steering member connected to the wheel assembly such that movement of the steering member causes corresponding movement of the wheel assembly to alter the direction of travel wherein,
- the steering member is provided with a load supporting or carrying means for supporting the load in use of the wheeled device such that the load supported by the load supporting means moves in accordance with movement of the steering member.

Typically, the wheeled device of the present invention is a golf buggy or cart. More typically, the buggy or cart is provided with a seat. More typically, the seat is movable between at least two different positions wherein one of the positions corresponds to a "ride-on" position in which the golfer sits on the buggy whilst another position corresponds to a "walking" position in which the golfer walks behind or beside the buggy. Even more typically, the buggy is convertible between the at least two positions by movement of the steering member, preferably movement in the vertical plane.

Typically, the load is a golf bag and golf clubs. More typically, the golf buggy is adapted to carry and transport a golf bag containing golf clubs. More typically, the buggy of the present invention is particularly adapted for use with a so called "suit-case" style of golf bag in which the golf club heads are orientated downwards so as to lower the centre of gravity of the golf bag and clubs to aid stability for the buggy. More typically, the golf bag is openable along a centre line to provide access to the clubs in the manner of a luggage suit case. Even more typically, the suit case style golf bag is provided with a hinge arrangement, preferably located at the rear of the bag along the centre line to assist in opening of the suit case style golf bag to provide access to the golf clubs.

Typically, the wheel assembly includes an axle and a pair of spaced apart wheels located at either end of the axle. More typically, movement of the steering member causes corresponding movement of the axle to move the pair of wheels. Even more typically, movement of the steering member in one direction, say to the left hand side of the golfer, causes the buggy to move to the right hand side.

Typically, the steering member is fixedly connected to the wheel assembly. Alternatively, the steering member is movably connected to the wheel assembly such that the steering member can adopt a number of different positions, preferably at least two different positions with respect to the assembly.

One of the different positions corresponds to the "walking" position in which the steering member is located in a relatively more horizontal or lowered position in which the steering member extends more rearwardly toward the rear of the buggy so that it can be gripped by the golfer when walking beside or behind the buggy. Another position is the "ride-on" position in which the steering member is relatively more vertical or in a raised position allowing the steering member to be moved by the golfer when sitting on the buggy. Typically, the steering member is a steering arm, tiller or the like.

Typically, the steering arm is provided with two steering elements. More typically, the first steering element is located at or towards one end of the steering arm. Even more typically, the first steering element is a handle for gripping by the golfer when the buggy is in the "walking" mode.

More typically, the second steering element which is a steering bar or T-bar is located relatively more intermediate on the steering arm, preferably spaced apart from the first steering element. Even more typically, the second steering element is for use when the buggy is in the "ride-on" mode.

Typically, the steering arm is provided with a control means for controlling operation of the buggy, preferably, for controlling operation of the motor or motors of the buggy. Even more typically, the control means is located intermediate the two steering elements and can be reached by the golfer when in both the "ride on" mode when sitting on the seat and when walking with the buggy.

One embodiment of the golf buggy of the present invention is a primarily "walk" only buggy whereas other embodiments of the buggy are "walk" and "ride" buggies whilst still further embodiments are primarily "ride" only buggies. Even more typically primarily "ride-on" buggies are extendible to increase the wheel base of the buggy and to provide greater space and more comfort for the feet of the golfer when in the "ride-on" mode.

Typically, the buggy of the present invention can be dismantled into component pieces for transporting in the car boot or automobile trunk.

Typically, the control means of the buggy of the present invention includes a 3-position switch corresponding to "walk" mode, "ride" mode, off, and a speed control rheostat or similar. More typically, the walk speed is about 50% of the "ride" speed.

Typically, the steering arm is pivotal substantially in the horizontal plane from side to side to turn the buggy in use and is adjustable in the vertical plane to adopt positions corresponding to either one of the different operating modes.

Typically, the steering arm is a single member bent to shape at a number of different locations. Typically, the steering arm is hinged at one or more places along its length to provide more rearward extension at a lower height when in the "walk" mode. More typically, the steering arm is made of two, three, four or more components interconnected or hingedly connected together so that each of the components may be angularly inclined to the other components to provide a steering arm of the correct shape.

Typically, the steering arm is located between steering supports. Typically, the steering arm is associated with a lock means or detente for locking or holding the steering arm and wheel assembly in the straight position to prevent unwanted turning of the buggy in use. More typically, the steering arm is provided with a retaining means for maintaining the steering arm in a position corresponding to the ride on position.

Typically, the front wheel assembly or rear wheel assembly or both are provided with a suspension means allowing the wheels to traverse uneven ground more easily. More typically, the wheels are sprung or hinged about a central pivot point allowing the wheels to pivot with respect to each other. Even more typically, the buggy is provided with a front wheel assembly and a rear wheel assembly. Typically, the wheel assembly or rear wheel assembly is hinged or sprung.

Typically, the base or chassis of the buggy is extendible, more typically, longitudinally extendible, preferably longitudinally extendible in the forward direction to increase the foot room of the golfer and to increase the stability of the buggy. More typically, the buggy is provided with an extension means having a number of components. Even more typically, the components move in unison when the buggy is extending or retracting.

Typically, the load support includes one, two or more separate load support elements. More typically, the load support elements are adapted to support a golf bag, preferably a suit case type golf bag. Even more typically, the golf bag support elements are spaced apart from each other. Even more typically, one of the bag supports is located at or towards the lower end in use of the steering arm. Even more typically, the lower bag support is a plate, tray or similar. Even more typically, the tray is a two part tray in which the two parts can move with respect to each other. More typically, the tray is a hinged tray, preferably hinged about the centre line towards the rear in use, in which the two parts of the tray move in accordance with movement of the two parts of the 'suit case' styled golf bag when the golf bag is opened to gain access to the golf clubs.

Typically, the on one of the other bag support elements is located intermediate the ends of the steering arm, more typically at or towards the top or middle of the steering arm. More typically, the bag support is a yoke, cross-member or similar transversely extending element. Even more typically the cross-member is a Y-shaped yoke, an arcuate or semi-circular support or the like. Even more typically the bag support element is hinged to the steering arm or to the steering element, preferably the lower steering element.

The present invention will now be described by way of non-limiting examples with reference to the accompanying drawings in which:

FIG. 5 is a vertical cross-sectional view of a part of the front wheel assembly.

FIG. 6 is a partial vertical sectional view along line 6 to 6 of FIG. 1 of one from of the detent for maintaining the buggy in a straight ahead position.

FIG. 7 is a vertical sectional view taken along the line 7 to 7 of FIG. 1 of one form of the rear wheel assembly of the present invention FIG. 8 is a side view of a different form of the buggy of the present invention in the "walk" mode.

FIG. 10 is a side view of the seat of the form of the buggy shown in FIG. 8 in the "ride" mode.

Figure 1:
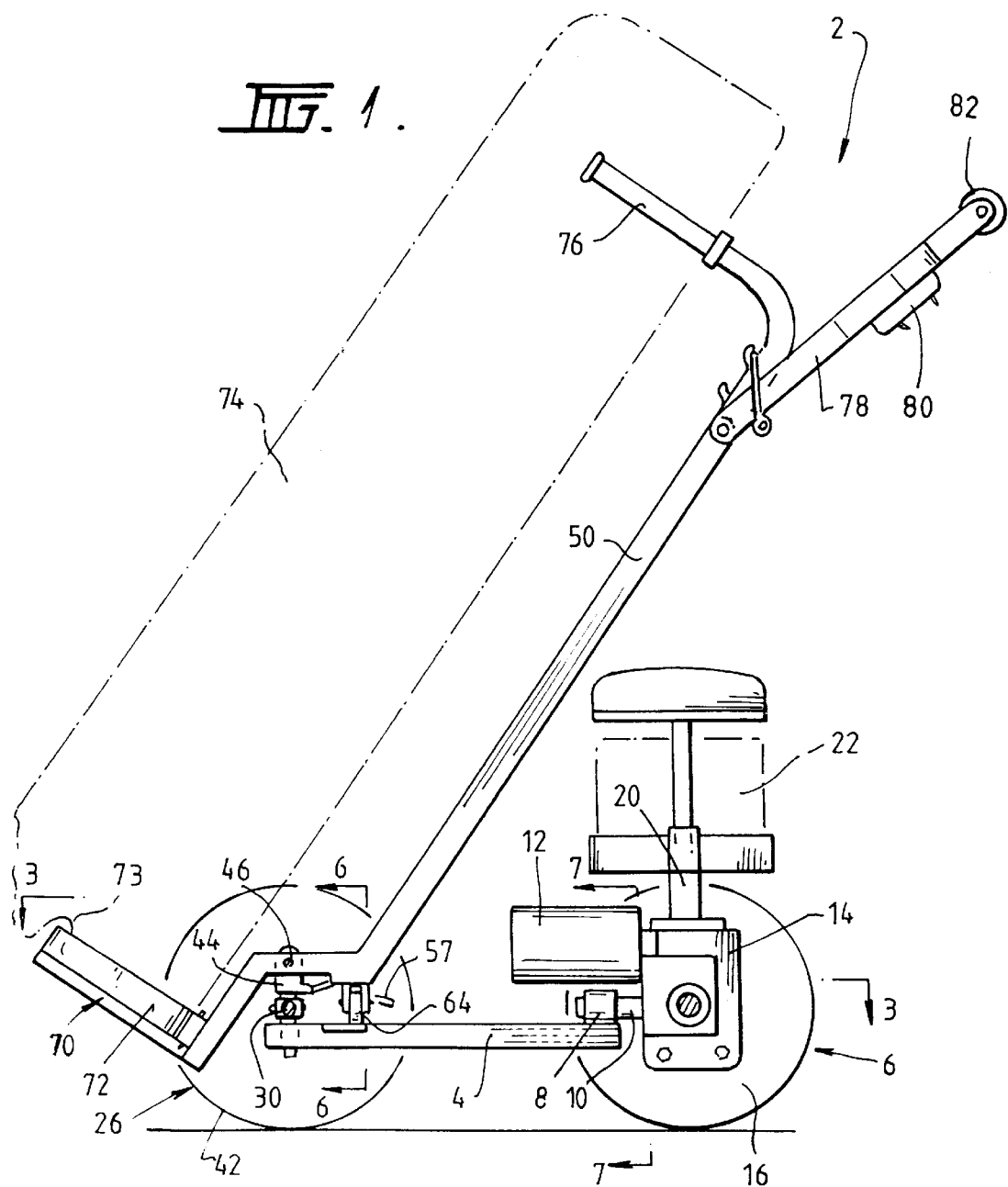
FIG. 1 is a side elevation view of one form of the golf buggy of the present invention in the walk mode in which the golfer walks behind the buggy.

In FIGS. 1 to 7 there is shown one form of the golf buggy or cart of the present invention, generally denoted by reference numeral 2. Buggy 2 has a number of different components or subassemblies which are assembled together to form the buggy. The buggy can be disassembled into the various components for ease of transport in a motor vehicle. However, it is to be noted that not all forms of the buggy can be disassembled or dismantled.

An elongate longitudinally extending lower chassis member 4 which is made from tubular metal section or similar, typically a hollow square section tube, is provided at the base of buggy 2 to interconnect a rear wheel assembly 6 and a front wheel assembly 26.

Figure 13:
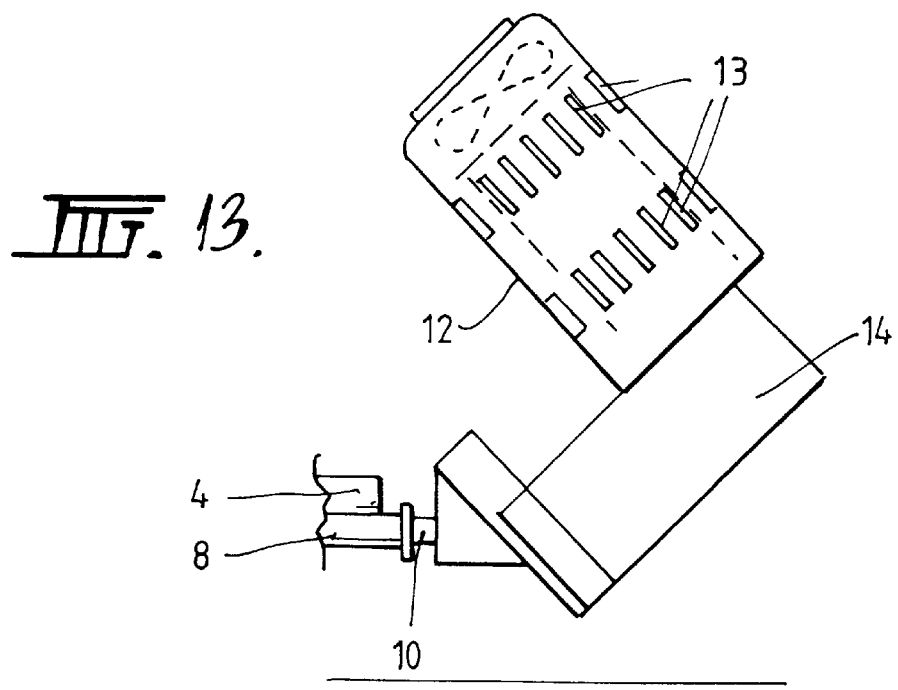
FIG. 13 is a side view of a different form of the drive motor having provision for air circulation.

Rear wheel assembly 6 is connected to chassis member 4 by a coupling which includes collar 8 in which is received shaft 10. The rear wheel assembly includes an electric motor 12, typically, a 12, 24 or 32 volt motor driven by a suitable battery 11 such as a 12 volt car battery, mounted so as to extend substantially axially horizontally. It is to be noted that more than a single motor can be used to power the buggy, such as one, two or three separate motors can be used. Further the motor or motors can be of any suitable type. One particularly preferred form of the motor is shown in FIG. 13 which motor is provided with a slotted housing having a number of air vents 13 for allowing the motor to be cooled by circulating air through and around the meter in use. Optionally, the vents are provided with protection from the rain so as to prevent moisture penetrating into the motor through the housing. Motor 12 is provided with either a single output shaft or a pair of output shafts for driving a pair of ground contacting or road wheels 16 depending upon the actual construction of the buggy. A transmission and/or differential arrangement 14 is optionally provided between the motor 12 and the road wheels 16 or alternatively an electronic control system (not shown) is provided to adjust individually the speed of rotation of ground wheels 16, particularly when cornering.

A pair of driving shafts 18 extend outwardly from transmission/differential 14 to drive road wheels 16. A further tubular framework member in the form of a tubular rod 20 extends substantially vertically upwards from rear wheel assembly 6 or from chassis member 4 depending on the form of the buggy. An adjustable seat 22 is hingedly connected to the top of rod 20 so as to be able to adopt a number of different configurations depending on the mode of use of the buggy. Seat 22 may be folded flat ie. horizontal so that a golfer can sit upon it or it may be folded down ie. vertical, if required when the buggy is in the walk mode or folded to clear movement of the steering member. Alternatively, seat 22 may be fixed to the top of rod 20, but still provided with adjustment. Other arrangements of the seat are also possible as shown in FIGS. 8 and 10.

Figure 4:
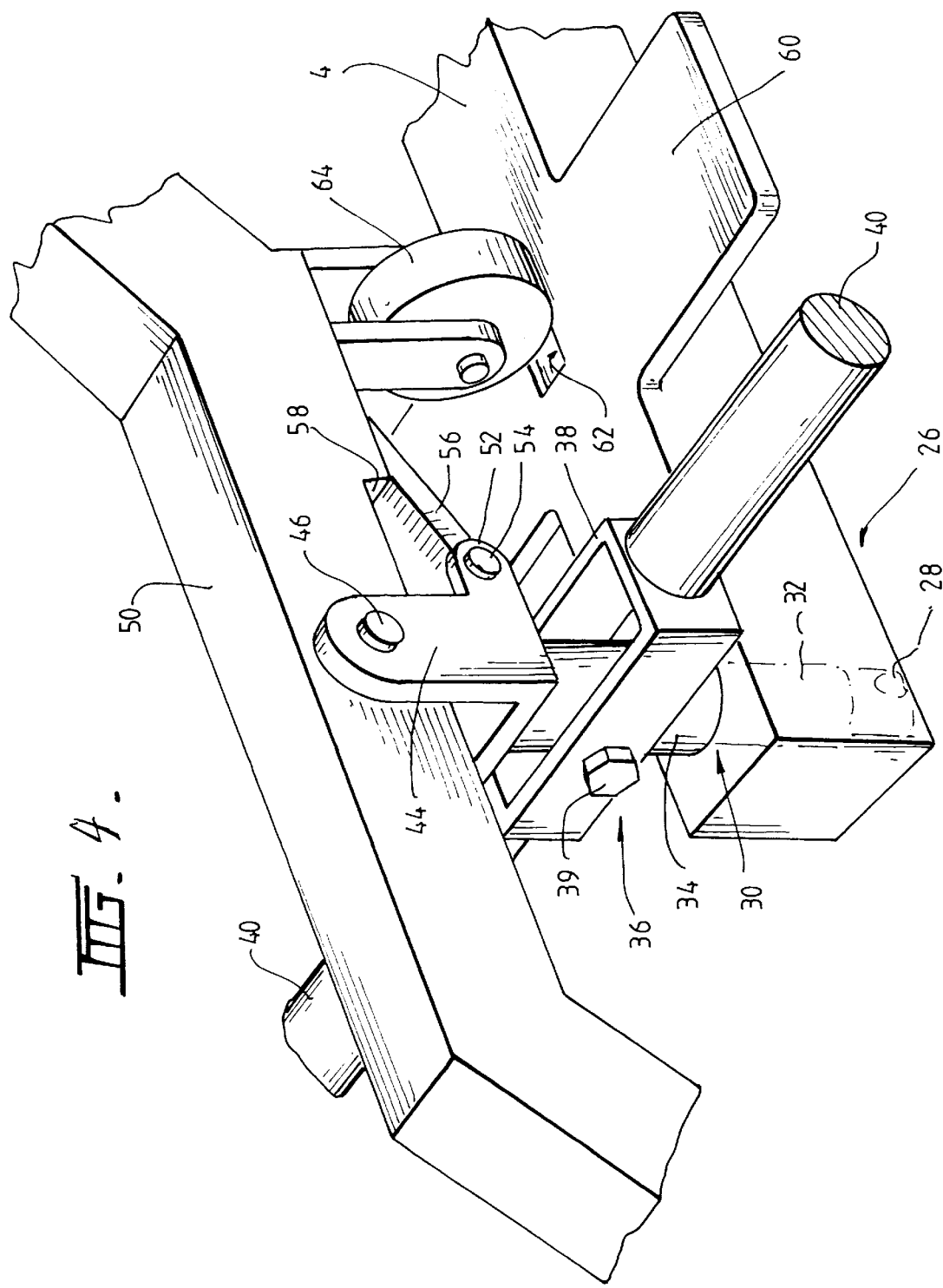
FIG. 4 is a close-up more detailed perspective view of part of the front wheel assembly showing the connection of the steering arm to the chassis member.
Figure 9:
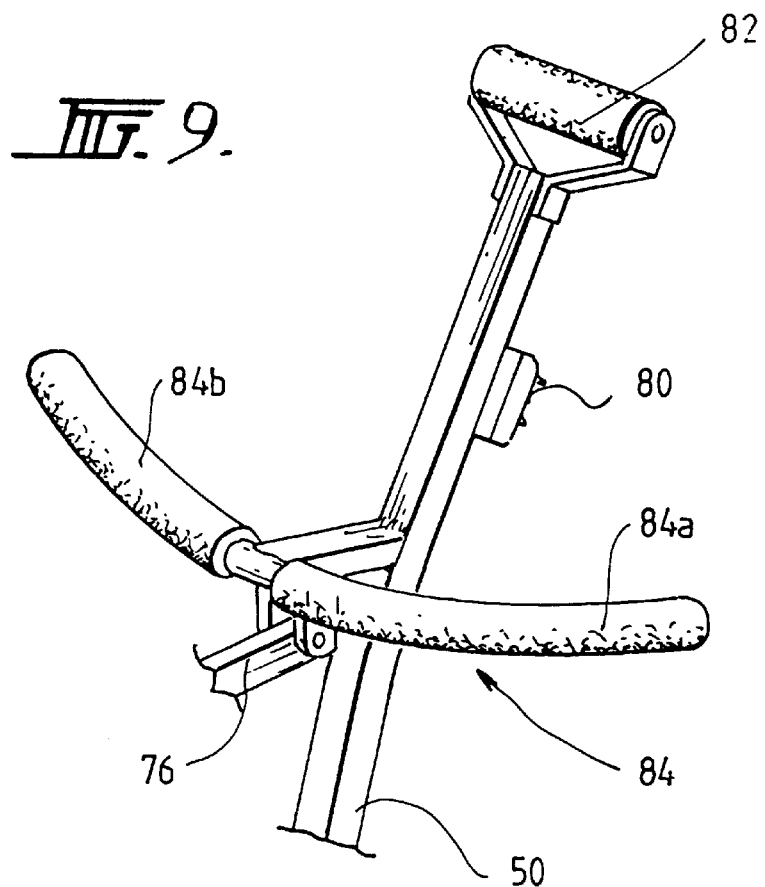
FIG. 9 is a perspective view of one form of the upper part of the steering arm showing the two different steering elements.

A steerable front wheel assembly 26 is provided at the forwardly directed end of chassis member 4 to control the direction of movement of buggy 2 in use. With particular reference to FIG. 4 the manner in which the front wheel assembly 26 is attached to chassis member 4 will now be described. A substantially vertically orientated bore is provided at or towards the forward end of chassis member 4, for pivotably receiving the lower part of a substantially vertically arranged pivot pin 30. A pin 28 or similar retaining means is provided at the lower end of pivot pin 30 for retaining pivot pin 30 in the bore. Pivot pin 30 is provided with a relatively smaller diameter portion 32 which is received in the bore of chassis member 4 and a relatively larger diameter portion 34 forming a shoulder therebetween to locate pin 30 in the bore at the desired height. In one form, axle 36 which is provided with a substantially rectilinear open centre section 38 is connected to the enlarged diameter portion 34 of pivot pin 30 by a suitable fastener or similar, such as a threaded bolt 39, grub screw or similar by the upper portion of pin 30 being received inside open portion 38. A pair of stub axles 40 are provided on either side of open central sections 38 upon which a pair of ground contacting wheels 42, are journalled for rotation at either end. The arrangement allows the axle 36 to pivot to compensate for uneven ground. In other forms of the buggy, pivot pin 30 is welded or otherwise fixedly attached to axle 36 so that axle 36 is not pivotable to accommodate movement of wheels 42 over rough terrain.

A pair of spaced apart generally upwardly extending brackets 44 in the form of a yolk are attached to the end of pivot pin 30 by welding or the like. Each bracket 44 is provided with an aperture so that the pair of apertures are in alignment with each other. A steering arm 50 which is also provided with a bore or similar aperture is located between the pair of brackets 44 so that the aperture of the steering arm is aligned with the pair of apertures of the brackets 44. A retaining pin 46 or suitable fastener is located through all of the aligned apertures to pivotally connect steering arm 50 to the brackets 44. Side ways horizontal movement of steering arm 50 causes corresponding sideways horizontal movement of axle 36 to turn the buggy 2 in use. Steering arm 50 is pivotally connected to steering arm support bracket 44 by pin 46 which allows steering arm 50 to move relative to the front wheel assembly in a substantially vertical plane in order to convert the buggy between the two operating modes which will be described in more detail later.

Figure 2:
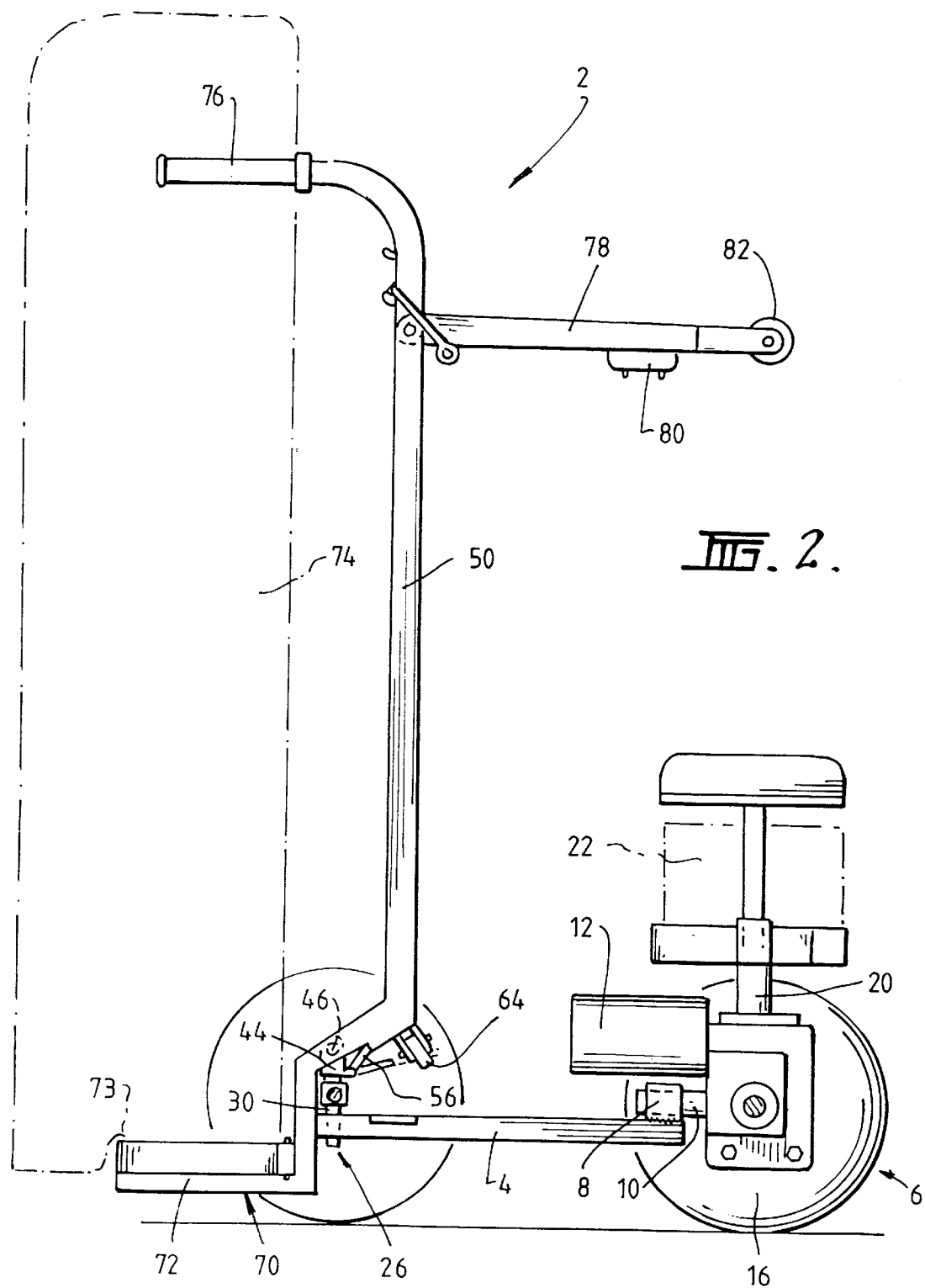
FIG. 2 is a side elevation view of the form of the buggy shown in FIG. 1 but in the ride-on mode in which the golfer rides on the buggy or is a further "walk" mode.

Each of brackets 44 is provided with a tab portion 52 having an aperture located therein arranged so that the pair of apertures of the tabs 52 are aligned with each other to receive pivot pin 54 therethrough. One end of a locking lever 56 is connected to pivot pin 54 to pivot about this pin. However, other arrangements of the locking lever 56 are possible. The underside of steering arm 50 is provided with a rebate or shoulder 58 forming a step. The free or distal end of locking lever 56 is free to move in and out of engagement with shoulder 58. When the buggy is in the ride-on mode with steering arm 50 in the forward substantially vertical position as shown in FIG. 2 locking lever 56 is received in rebate 58 thereby preventing steering arm 50 from moving rearwards as the rear section of this arm is prevented from pivoting downwards. When the buggy is in the walk mode as shown in FIG. 1, the locking lever 56 is disengaged from rebate 58 as shown in FIGS. 1, 4 and 5 which allows steering arm 50 to adopt a more rearward lower position enabling the buggy to be steered from behind by the golfer since the rear portion of arm 50 is free to pivot downwardly. A foot pedal 57 is also connected to pivot pin 54 and/or to one side of locking lever 56 to move locking lever 56 from engagement with rebate 58 to release the steering arm. Foot pedal 57 makes it more convenient to lock and release steering arm 50.

A generally transversely extending cross piece 60, acting as a roller track, having a notch 62 or similar gap or the like is provided towards the forward distal chassis member 4 just to the rear of axle 36. Steering arm 50 is provided with a downwardly depending roller 64 or similar for running over the surface of cross-piece 60. Notch 62 is positioned such that roller 64 is received therein when the steering arm is in a position corresponding to the straight ahead position of the front wheels of the buggy in order to maintain the buggy heading in this direction. To release roller 64 from notch 62 steering arm 50 is lifted upwards or pushed forward and/or sideways to pivot about pin 46 to raise roller 64 until it is clear of notch 62. Steering arm 50 can then be freely moved sideways as roller 64 is free to roll over the upper surface of cross piece 60. Optionally, stop means (not shown) are provided at or towards the end of cross piece 60 to limit the amount of sideways movement of arm 50. A torsion spring 66 or similar is optionally provided around pivot pin 46 to assist in pivoting steering arm 50 to release it from being retained in the straight ahead position.

Figure 3:
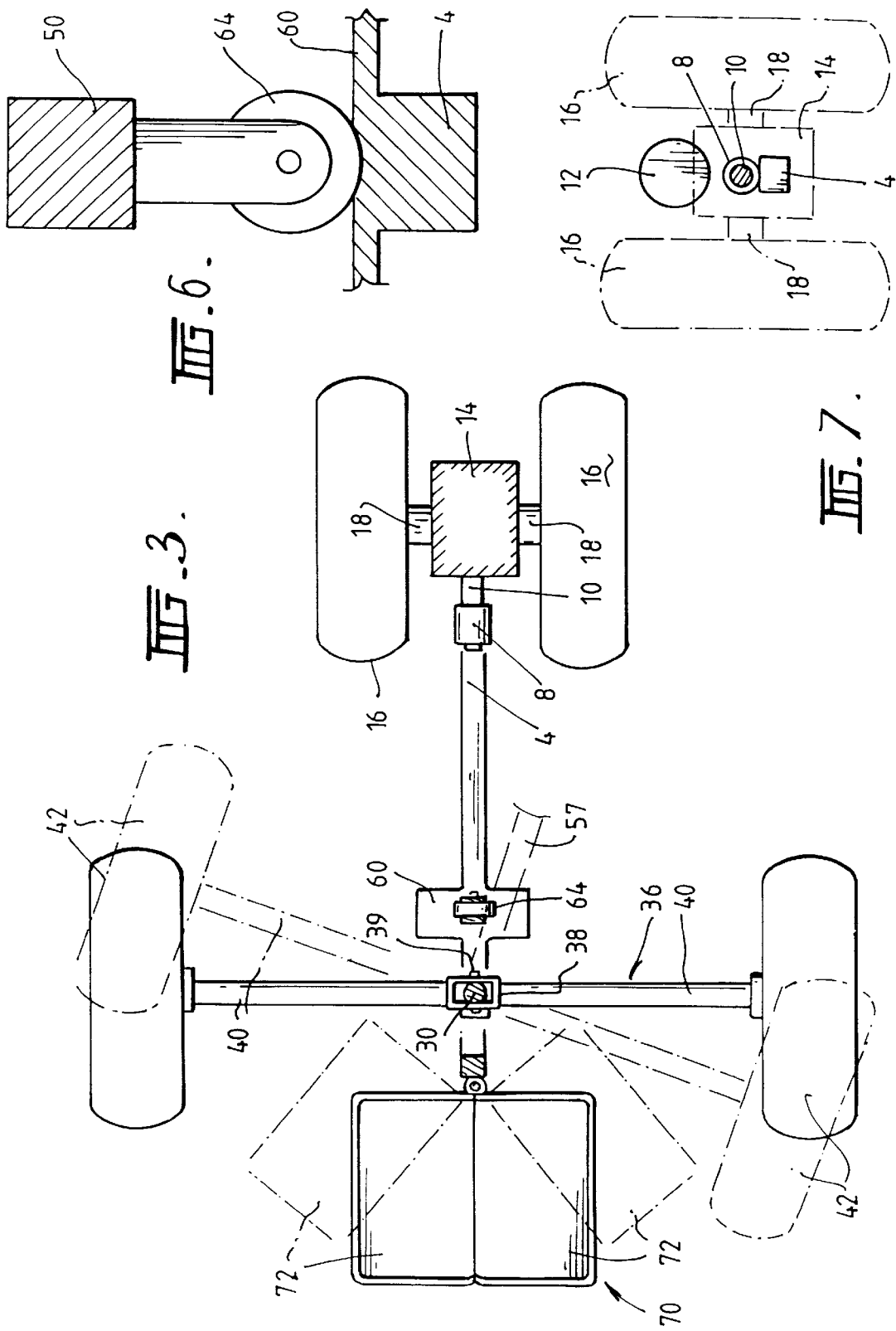
FIG. 3 is a partial horizontal sectional view of the buggy taken along the line 3 to 3 of FIG. 1.

One form of steering arm 50 will now be described. It is to be noted that steering arm 50 can take any number of different forms, all of which are of a generally complex shape having a number of angularly inclined sections. The forwardly directed end of steering arm 50 is provided with a lower golf bag support in the form of a hinged or opening tray 70 for supporting the bottom of a golf bag 74 containing a set of golf clubs. One form of the support tray 70 which is shown in FIGS. 1, 2 and 3 is a generally square or rectangular tray having two parts 72 which join together along the centre line of the tray. It is to be noted that support tray 70 can take any suitable shape or configuration depending upon the type and style of golf bag being carried by the buggy. However, it is to be noted that the shape of tray 70 as illustrated is adapted for use with a suit case style golf bag. In this arrangement the base of the golf bag is provided with a recess 73 for engaging with the lip of the tray 70 as shown in FIG. 1. When the suit case style bag is to be opened, as the two halves 72 of the tray are hinged together at the rear, the two haves 72 move apart about the forwardly orientated centre line of the bag since the lip of the tray 70 is received in recess 73 which causes the trays to move in accordance with movement of the two parts of the suit case style bag. This movement is shown in phantom in FIG. 3. The two parts 72 of the tray 70 are held closed or open by an elasticised strap or other spring means in use.

Steering arm 50 has a number of sections angularly inclined to each other at the lower and or forward end in use as shown particularly in FIGS. 1 and 2. At or towards the top of steering arm 50 is provided a golf bag support 78 for retaining the top of the golf bag 74 in place. The golf bag support 76 can take any suitable shape or configuration for retaining the golf bag on the buggy in use. Steering arm extension 78 is hingedly connected towards the top of steering arm 50 and provided with releasably securing means such as a catch, clasp, hook or similar for securing the extension 78 to arm 50 or allowing extension 78 to hingedly move away from arm 50. The position adopted by extension 78 shown in FIG. 1 corresponds to the "walk" mode whereas the position adopted by extension 78 shown in FIG. 2 corresponds to the "ride" mode. Controls 80 are provided on extension 78 for controlling operation of motor 12, such as for example, forward, reverse and speed of the buggy controls. A handle 82 is provided at the distal end of extension 78. Handle 82 is one example of the second steering element provided on the steering member.

With particular reference to FIGS. 8 to 13 another form of the buggy 2 of the present invention will be described. In this form of the buggy 2 the rear wheel assembly 6 includes a battery or batteries 11, a motor 12 and a pair of rear wheels 16 for driving the buggy. The front wheel assembly 26 is the same as or similar to the front wheel assembly 26 of the form of the buggy shown in FIGS. 1 to 7. In this embodiment upwardly extending tubular rod 20 is bent so as to have two parts 20a, 20b angularly inclined to each other so that seat 22 is hingedly movable between a number of different configurations. Two configurations are shown in FIGS. 8 and 10 with that of FIG. 8 corresponding to the walk mode whereas that of FIG. 10 corresponds to the ride mode.

Also in this embodiment steering arm 50 is of a one piece construction, with golf support 76 being hingedly connected to steering T-bar 84 which in turn is fixedly connected to steering arm 50. Steering T-bar 84 includes two transversely extending handles 84a, 84b. This is an example of the first steering element provided on the steering arm. When in the "ride" mode the golfer sitting on seat 22 can control the direction of buggy 2 by moving T-bar 84 in the desired direction to turn wheels 42 since movement of T-bar 84 causes corresponding movement of steering arm 50 which in turn is connected to wheels 42 as described previously.

Figure 11:
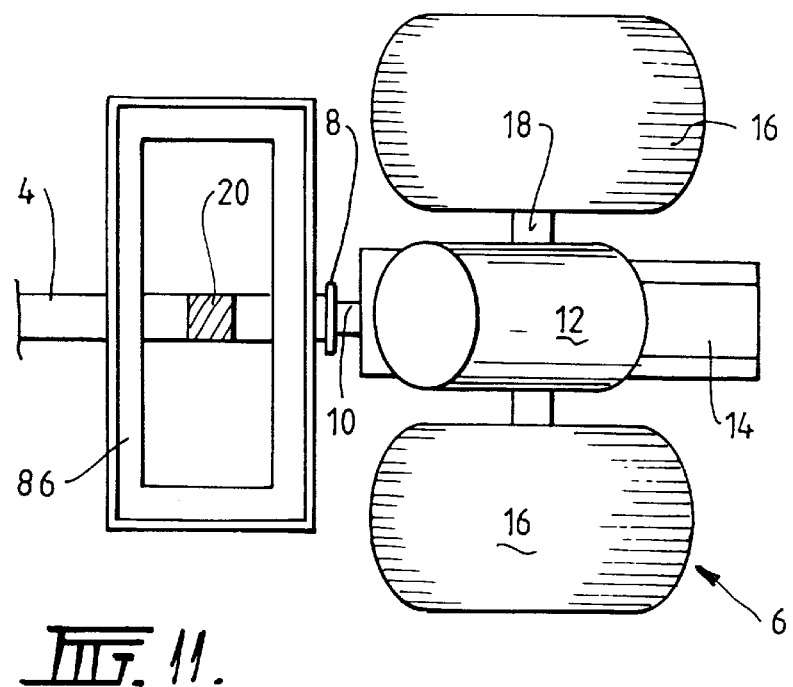
FIG. 11 is a horizontal cross sectional view along the line 11 to 11 of FIG. 8.
Figure 12:
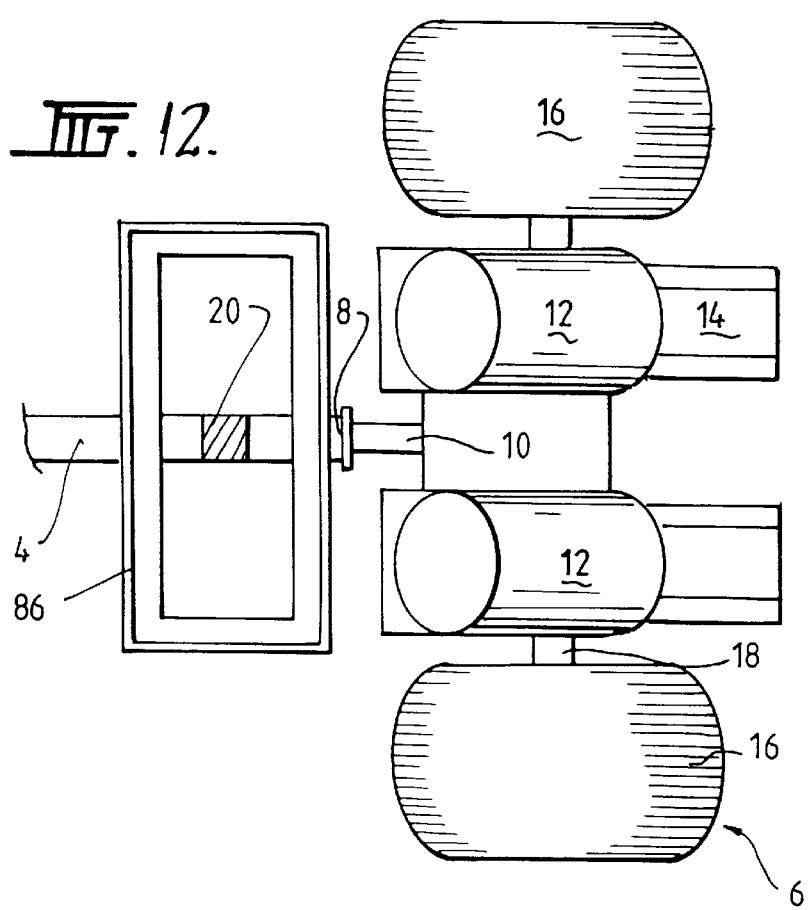
FIG. 12 is a partial plan view similar to FIG. 11 showing a different arrangement of the drive motors and wheels.

With particular reference to FIGS. 11 and 12 different arrangements of the rear wheel assembly 6 are illustrated and now described. In the embodiment of FIG. 11, a single motor 12 is used to drive wheels 16 through transmission 14. In this embodiment a substantially rectilinear framework 86 is provided to receive a motorcycle or car battery in use to power motor 12. An alternative rear wheel assembly is shown in FIG. 12 which is provided with two motors 12 driving rear wheels 16 through transmission 14. Battery framework 86 is provided for receiving a motorcycle or car battery in use.

In FIGS. 14 to 18 there is a still further embodiment of the present invention which allows for the wheelbase of the buggy 2 to be changed depending on circumstances. Similar reference numerals will be used in describing this embodiment as were used in referring to corresponding features of the forms of the buggies already described. In this embodiment there is a chassis framework 90 upon which is mounted motor 12, transmission 14, ground contacting wheels 16 and drive shafts 18 forming the rear wheel assembly 6.

An extending mechanism, generally denoted as 92, which is connected to the forwardly directed end of chassis frame 90 is located beneath the forward member 90a of the chassis frame 90. The mechanism includes a pair of intermeshed gear wheels 94a, 94b located for rotation beneath chassis member 90a so that when the locking lever 91 is released, both of the gear wheels can rotate in unison. One end of extension arm 96a is fixedly connected to the underside of gear wheel 94a so that extension arm 96a moves in an outwardly extending arch when gear wheel 94a is rotated. A connecting rod 98a is pivotally connected to one end of the extension arm and at the other end is connected to front wheel assembly 26. Similarly, an extension arm 96b and connecting rod 98b are located on the other side of the extension mechanism to extend outwardly and forwardly in response to rotation of gearwheel 94b. The forward ends of both connecting rods 98a, 98b are pivotally connected to front wheel assembly 26, such as by being pivotally connected to front axle 36 or to the pair of stub axles 40.

Figure 14:
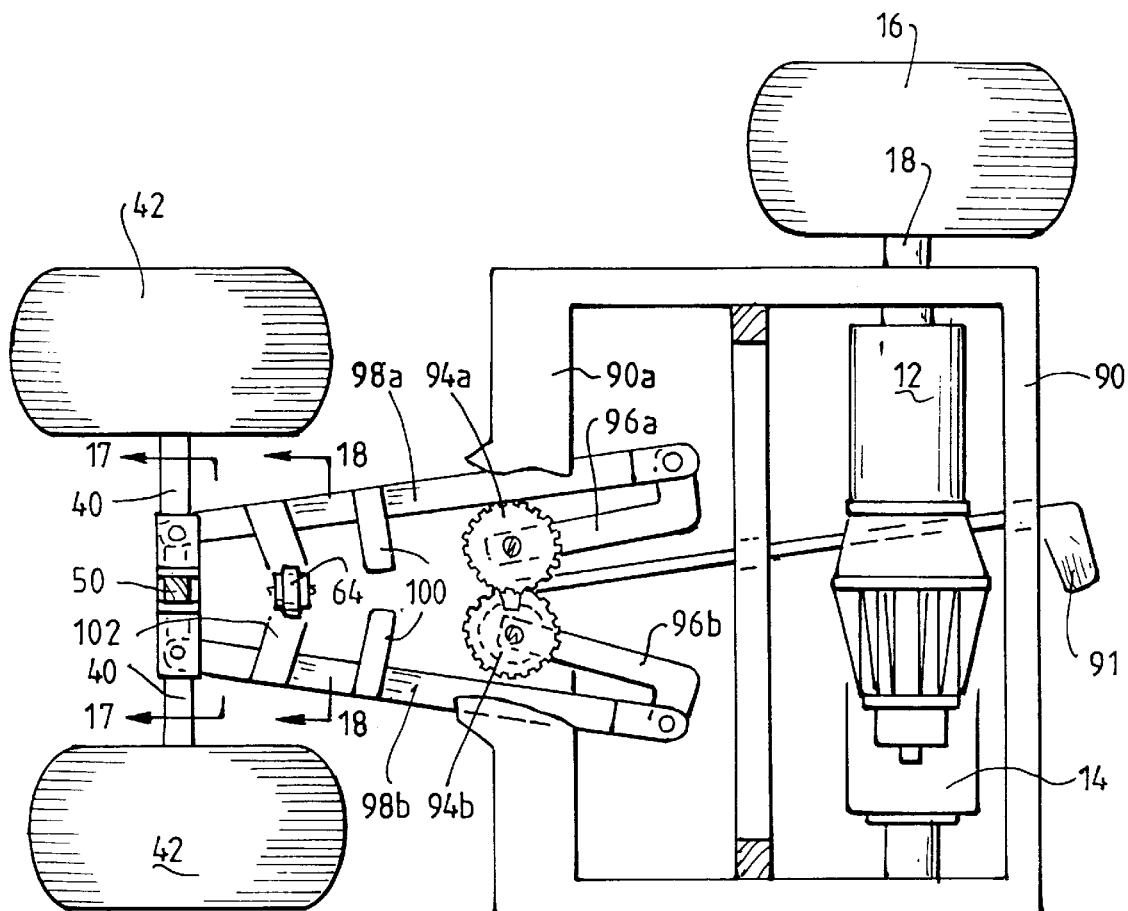
FIG. 14 is a plan view of a still further embodiment of the buggy of the present invention showing the mechanism for extending the wheel base of the buggy in a retracted position.
Figure 17:
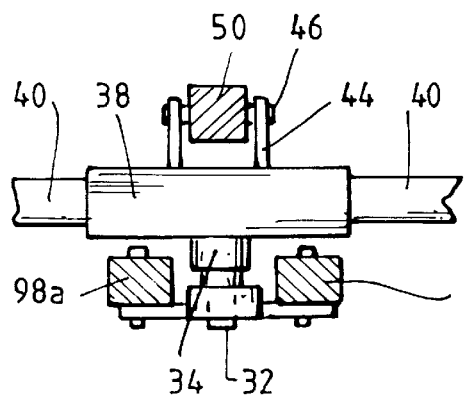
FIG. 17 is a cross sectional view taken along the line 16 to 16 of FIG. 14.
Figure 18:
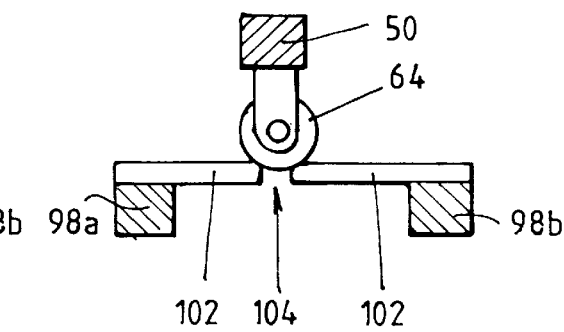
FIG. 18 is a cross sectional view taken along the line 18 to 18 of FIG. 14.
Figure 15:
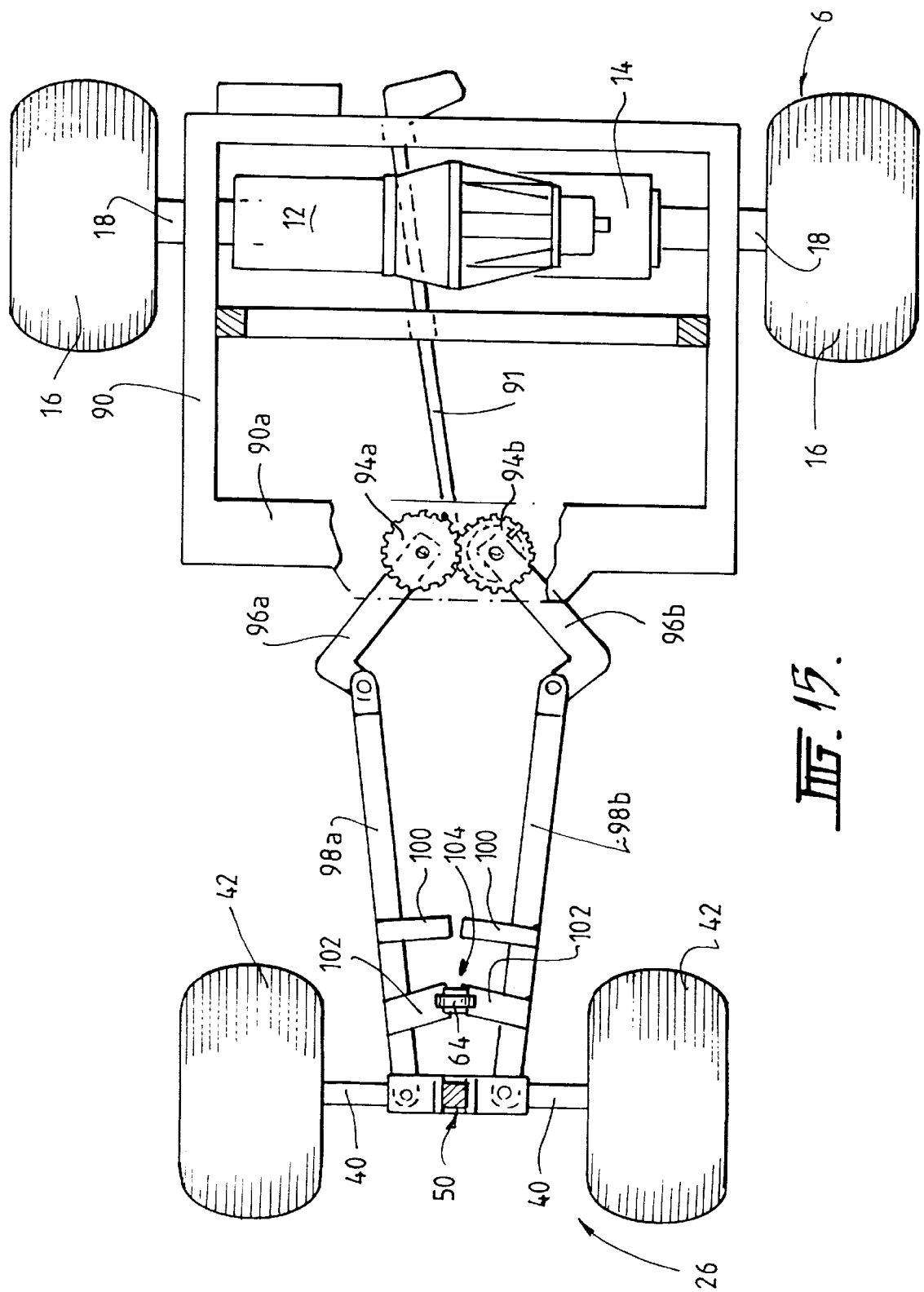
FIG. 15 is a similar view to FIG. 14 showing the mechanism for extending the wheel base of the buggy in an extended position.

The extending mechanism in the retracted position is shown in FIG. 14 in which the pair of extension arms 96a, 96b are arranged to extend towards the rear of buggy 2 and connecting rods 98a, 98b are also located close to and rearward of the meshed gearwheels 94a, 94b. As the gearwheels are caused to rotate in unison both of the extension arms 96a, 96b and both connecting rods 98a, 98b move in unison first outwardly and forwardly and then inwardly and forwardly until they adopt a fully extended position as shown in FIG. 15.

A foot rest 100 is located on either connecting rod 98 towards the forward end to extend inwardly for providing support for the feet of the golfer when riding the buggy. Similarly, a roller track support 102 is provided on either connecting rod 98 to extend inwardly towards each other to form a gap 104 between the respective distal ends of the roller tracks 102. Roller 64 is located in gap 104 when the steering assembly is in the straight ahead position. As the steering arm 50 is moved sideways, roller 64 travels along the upper surface of roller tracks 102 in a manner similar to that as described previously. It is further to be noted that the steering arm 50 is connected to axle 36 in the same or a similar manner to that described previously with respect to FIGS. 1 to 7.

Figure 16:
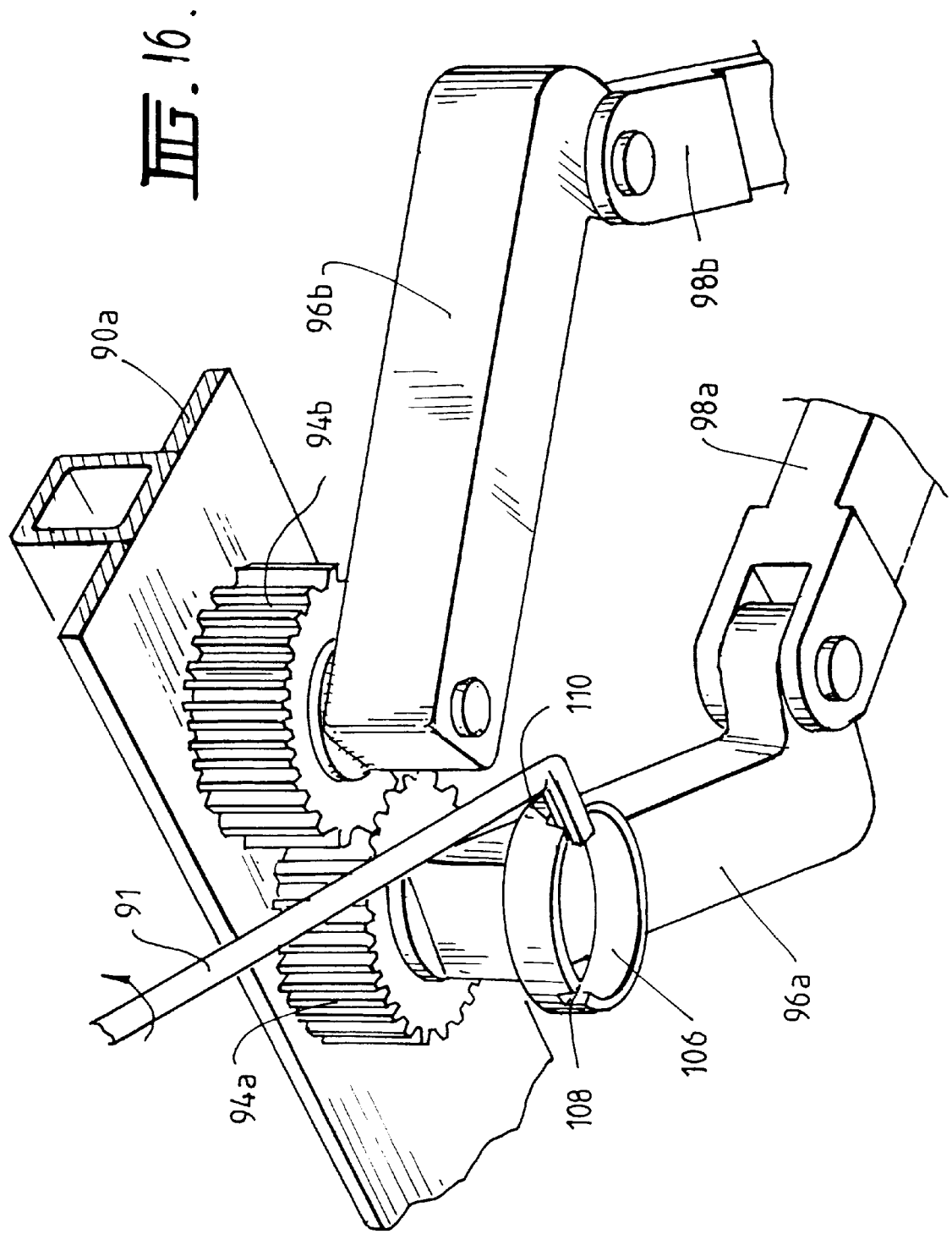
FIG. 16 is an underneath view of the mechanism for extending the wheel base of the buggy in an extended position.

A suitable lock means is provided to lock the extending mechanism in either of the retracted position or the extended position. Any suitable lock means can be employed such as, for example, locking lever 91 and locking ring 106. With particular reference to FIG. 16, locking ring 106 is located beneath gear wheel 94a and extension arm 96a to rotate in unison with gear wheel 94a when the buggy is being extended and retracted. Locking ring 106 is provided with notch 108 and notch 110. Lever 91 is rotatable to disengage/engage from notches 108, 110. When the end of lever 91 is in either notch it prevents rotation of ring 106 and hence locks the buggy in that position. When lever 91 is received in notch 108 the buggy is locked in the retracted position whereas when lever 91 is received in notch 110 the buggy is in the extended position. In operation, lever 91 is rotated so that its end is clear of notch 108 as the buggy is in the retracted position. The handle 82 of steering arm is pushed forward which in turn moves front wheel assembly 26 forward to extend the buggy. When in the fully extended position lever 91 is rotated to be received in notch 110 thereby locking the buggy in the extended position.

Advantages of the present invention include the following:

The golf buggy of the present invention is readily convertible between a "ride-on" mode and a "walk" mode by moving the steering arm to disengage the roller from the centring notch when it is desired by the golfer. Additionally, the conversion can be accomplished by pressing a foot operated lever to release the gears, pulling the steering handle backwards which moves the front wheels backwards onto the spring operated catch which secures the gears in the retracted position.

The described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

What is claimed is:

1. A wheeled device for carrying or transporting a load, said device being convertible between a first mode of use in which a steering member is in a first orientation and a second mode of use in which the steering member is in a second orientation, said device including:

a chassis member; and a steerable wheel assembly having a pair of ground contacting wheels capable of pivoting about the chassis member located at or towards one end of the chassis member for altering the direction of travel of the device wherein, said steering member is connected to the steerable wheel assembly so that movement of the steering member causes corresponding movement of the steerable wheel assembly to alter the direction of travel of the device in use of the device, said steering member is configured to move between first and second operating positions such that the first orientation of the steering member corresponds to the first operating position and the second orientation of the steering member corresponds to the second operating position so that when the steering member is in the first operating position the device is in the first mode of use and when the steering member is in the second operating position the device is in the second mode of use, and said steering member is provided with a load supporting member for supporting the load in use such that the load when being supported by the load supporting member moves in accordance with movement of the steering member when in the first and second operating positions, and the steering member is associated with a lock or detent for locking the steerable wheel assembly in a straight ahead position or for locking the steering member in either the first or second orientations.

2. A wheeled device according to claim 1 in which the steering member is a single member comprising a number of angularly inclined sections or is a two or multi-piece construction having a handle hingedly connected at or towards the upper end of the steering arm.

3. A wheeled device according to claim 1 in which the device is in the form of a golf buggy, a golf cart, a motorized golf buggy, or a motorized golf cart.

4. A wheeled device according to claim 1 further including a seat movable between two positions in which one position is for use by an operator sitting on the seat when the device is in the first mode of use and the other position is a stored position in which the seat is folded flat against a seat support allowing the operator to walk behind or beside the device when the device is in the second mode of use.

5. A wheeled device according to claim 1 in which the steering member is provided with a control means located with respect to the steering member so that the control means can be reached by an operator when the device is in both the first and second modes of use.

6. A wheeled device according to claim 1 in which the chassis member further includes an extending mechanism which can extend so as to increase the wheelbase of the device.

7. A wheeled device according to claim 1 in the form of a modular arrangement having individual modules interconnected together wherein the individual modules are readily disengagable from each other to assist in storage and transportation of the device in component form.

8. A wheeled device according to claim 1 in which the lock means is provided to lock the steering member in a more forward or vertical orientation so that the steering member is maintained in a more upright orientation when in the ride-on position.

9. A wheeled device according to claim 1 in which the detent means includes a roller and notch arrangement in which the roller is connected to the steering member for engagement in the notch provided on the chassis member so that the roller is received in the notch to detain the steering member in a position corresponding to the straight ahead position of the device when in the first mode of use.

10. A wheeled device according to claim 9 in which the roller is released from the notch by moving the steering member upwards or pushing forward on the steering member.

11. A wheeled device according to claim 1 in which the steering member is pivotal substantially in the horizontal plane from side to side so as to control the direction of movement of the device in use and the steering arm is movable in the vertical plane to move between the first and second operating positions.

12. A wheeled device according to claim 11 in which the steering member is provided with steering supports to assist in connecting the steering member to the steerable wheel assembly.

13. A wheeled device according to claim 1 in which the steering member is provided with one or more golf bag support elements or brackets for supporting the golf bag in use of the device.

14. A wheeled device according to claim 13 in which one of the golf bag support elements is a centre opening tray having a lip for being received in a groove located at the base of the golf bag such that when the golf bag is opened the tray opens into two parts to continue to support the golf bag.

15. A wheeled device according to claim 1 in which the load is a bag.

16. A wheeled device according to claim 15 in which the bag is a golf bag including golf clubs.

17. A wheeled device according to claim 16 in which the golf bag has a centre opening hinge.

18. A wheeled device according to claim 16 in which a heads of the golf clubs are oriented downwards so as to be close to the load supporting member.

19. A wheeled device according to claim 1 wherein the first mode of use corresponds to a ride-on position in which an operator of the device is transported by the device, and the second mode of use corresponds to a walk position in which the operator walks behind or beside the device.

20. A wheeled device according to claim 19 in which the device is convertible between the ride-on position and the walk position by movement of the steering member in a substantially vertical plane containing the steering member between a relatively more horizontal orientation and a relatively more vertical orientation.

21. A wheeled device according to claim 20 in which when the device is in the walk position the steering member is located in the relatively more horizontal orientation or in a lowered position so that the steering member extends relatively more rearwardly of the device enabling an operator to steer the device using the steering member whilst walking behind or beside the device.

22. A wheeled device according to claim 20 in which when the device is in the ride-on position the steering member is in the relatively more vertical orientation or in a raised position allowing the steering member to be located more forwardly of the device so that an operator travelling on the device can manipulate the steering member to control the direction of movement of the device whilst on the device.

23. A wheeled device according to claim 20 in which the steering member is a steering arm pivotally connected to the steerable wheel assembly.

24. A wheeled device according to claim 23 in which the steering arm includes a first steering element for use by an operator when the device is in the first mode of use wherein one end of the steering arm is movably connected to the steerable wheel assembly and a second steering element located at or towards the other end of the steering arm for use by an operator when the device is in the second mode of use.

25. A wheeled device according to claim 23 in which the steering arm is a tiller or tiller arrangement.

* * * * *

UNITED STATES PATENT AND TRADEMARK OFFICE
CERTIFICATE OF CORRECTION

PATENT NO.    : 6,474,427 B1
DATED         : November 5, 2002
INVENTOR(S)   : James William Tunnecliff It is certified that error appears in the above-identified patent and that said Letters Patent is hereby corrected as shown below:

<u>Title page,</u>
Insert item:
-- [30] Foreign Application Priority Data
Jan. 31, 2000 (AU)...............PQ5321
Apr. 16, 1999 (AU)..............PP9769 --

Signed and Sealed this

Twenty-second Day of July, 2003

JAMES E. ROGAN
*Director of the United States Patent and Trademark Office*